US009719724B2

(12) United States Patent
Stutz

(10) Patent No.: US 9,719,724 B2
(45) Date of Patent: Aug. 1, 2017

(54) METHOD AND DEVICE FOR DETECTING STRAIGHTNESS DEVIATIONS AND/OR DEFORMATIONS IN A ROTARY KILN

(75) Inventor: Thomas Stutz, Arni (CH)

(73) Assignee: HOLCIM TECHNOLOGY LTD, Iona (CH)

(*) Notice: Subject to any disclaimer, the term of this patent is extended or adjusted under 35 U.S.C. 154(b) by 509 days.

(21) Appl. No.: 14/129,421

(22) PCT Filed: Jun. 15, 2012

(86) PCT No.: PCT/IB2012/001168
§ 371 (c)(1),
(2), (4) Date: Dec. 26, 2013

(87) PCT Pub. No.: WO2013/001334
PCT Pub. Date: Jan. 3, 2013

(65) Prior Publication Data
US 2014/0134558 A1 May 15, 2014

(30) Foreign Application Priority Data
Jun. 27, 2011 (AT) .................................. A 933/2011

(51) Int. Cl.
F27B 7/42 (2006.01)
F27D 19/00 (2006.01)
(Continued)

(52) U.S. Cl.
CPC .............. F27B 7/42 (2013.01); F27D 19/00 (2013.01); F27D 21/00 (2013.01); F27D 21/02 (2013.01);
(Continued)

(58) Field of Classification Search
CPC .... G01B 11/16; G01B 11/2513; G01B 21/20; F27D 21/00; F27D 21/02; F27D 21/04
See application file for complete search history.

(56) References Cited

U.S. PATENT DOCUMENTS 5,361,308 A * 11/1994 Lee .................... G01B 11/2441
348/131
5,491,553 A 2/1996 Gebhart
(Continued)

FOREIGN PATENT DOCUMENTS

FI WO 2011058221 A1 * 5/2011 ................ F27B 7/26
JP 62034002 A * 2/1987
(Continued)

OTHER PUBLICATIONS

International Search Report in PCT/IB/2012/001168, dated Jan. 10, 2012 with English language translation.
(Continued)

Primary Examiner — Alissa Tompkins
Assistant Examiner — Nathaniel Herzfeld
(74) Attorney, Agent, or Firm — Fitch, Even, Tabin & Flannery, LLP

(57) ABSTRACT

A method for detecting straightness deviations and/or deformations in a rotary kiln (1), the rotary drum (4) of which includes bearing rings (6) spaced apart from one another in the axial direction and respectively supported on rollers (7), involves scanning the outer surface area (5) of the rotary drum (4), the bearing rings (6), the rollers (7) and/or the shafts (17) of the rollers (7) in a contactless fashion with the aid of at least one scanning device (12) such that three-dimensional position data regarding the scanned objects is obtained, and evaluating the three-dimensional position data with respect to the occurrence of a deviation of the rotary kiln axis (3) from a straight line, a deviation of the rotary drum (4) from a cylindrical shape and/or a deviation of the rotational axes (8) of the rollers from a line extending parallel to the rotary kiln axis (3). A device for detecting straightness deviations and/or deformations in a rotary kiln (1) is also provided.

13 Claims, 2 Drawing Sheets

Figure 1:
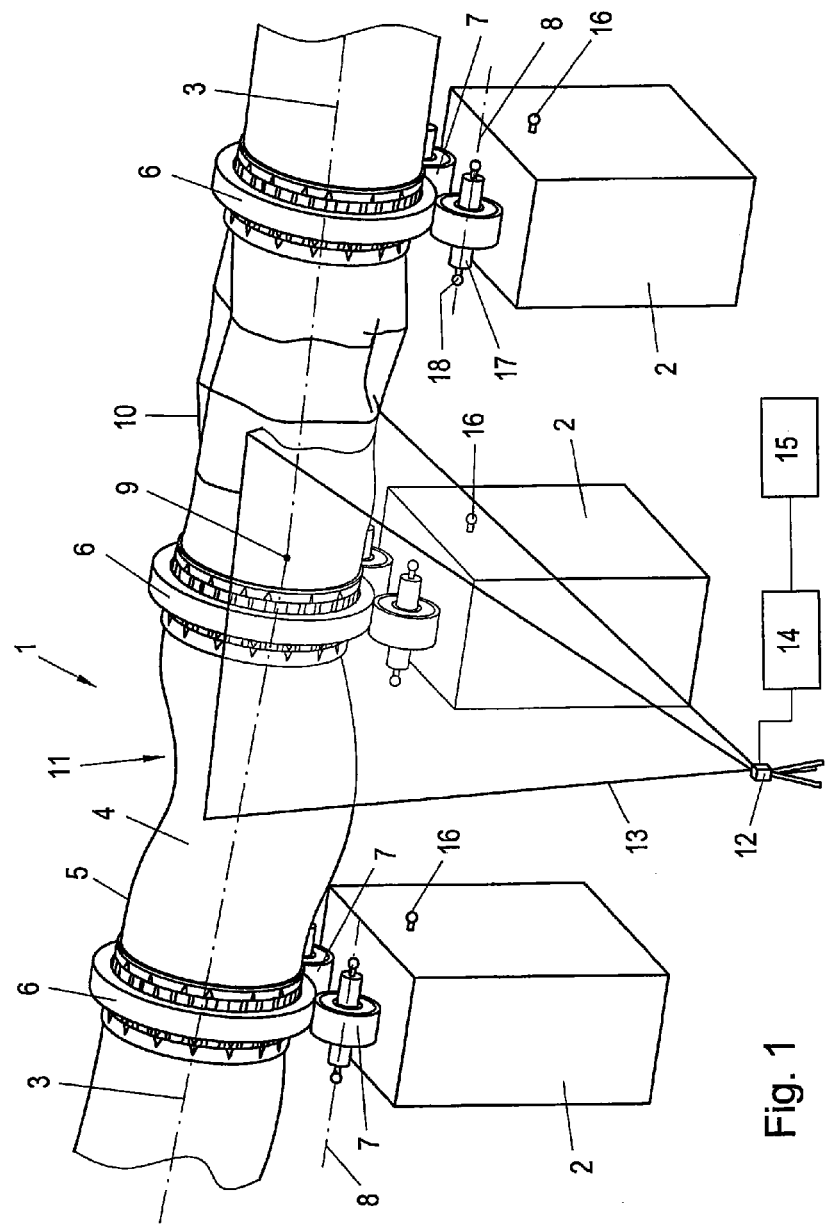

(51) Int. Cl.
*F27D 21/00* (2006.01)
*F27D 21/04* (2006.01)
*G01B 11/16* (2006.01)
*G01B 11/25* (2006.01)
*F27D 21/02* (2006.01)
*G01B 21/20* (2006.01)

(52) U.S. Cl.
CPC ............. *F27D 21/04* (2013.01); *G01B 11/16* (2013.01); *G01B 11/2513* (2013.01); *G01B 21/20* (2013.01)

(56) References Cited

U.S. PATENT DOCUMENTS

| | | | |
|---|---|---|---|
| 5,605,097 A * | 2/1997 | Ruckl | B41C 1/145 101/128.4 |
| 7,110,910 B1 * | 9/2006 | Deffenbaugh | G01B 11/245 702/155 |
| 2008/0204707 A1 * | 8/2008 | Hwang | G01M 11/085 356/35.5 |

FOREIGN PATENT DOCUMENTS

| | | | |
|---|---|---|---|
| JP | 2943956 B2 * | 8/1999 | |
| JP | 11344395 A * | 12/1999 | |
| JP | 2008107175 A | 5/2008 | |
| JP | 2011021805 A * | 2/2011 | |
| JP | 2014185788 A * | 10/2014 | |
| WO | 2011058221 A1 | 5/2011 | |

OTHER PUBLICATIONS

International Preliminary Examination Report with Amended Claims in PCT/IB/2012/001168, dated Sep. 27, 2013.
Terminplan der Vorträge zur Präsentation der Bachelor-Arbeiten 04. und 5. Feb. 2009 Bau 1 Tiefenhörsaal U37, Hochschule für Technik Stuttgart SG Vermessung und Geoinformatik, Jan. 14, 2009.
POLSCAN®—präzise Drehofen-Einstellung ohne Stillstandszeiten, KRUPP POLYSIUS.
POLSCAN®—Service zur Überprüfung der Drehofengeometrie, Dipl. Ing. Ansgar Päschke Polysius Anlagenservice.
Teiinehmer 2010, Polysius Ein Unternehmen von ThyssenKrupp Technologies.
Untersuchungen zum Einsatz eines Laserscanners zur Vermessung von Zementdrehöfen, Hochschule für Technik Stuttgart, Stuttgart University of Applied Sciences.
Polysius Technologie Forum 2010 Ofentechnik Seminafahrplan.

* cited by examiner

METHOD AND DEVICE FOR DETECTING STRAIGHTNESS DEVIATIONS AND/OR DEFORMATIONS IN A ROTARY KILN

CROSS-REFERENCE TO RELATED APPLICATIONS

This Application is a U.S. National Stage Application filed under 35 U.S.C. §371 of International Application PCT/IB2012/001168, filed Jun. 15, 2012, designating the United States, which claims priority from Austrian Patent Application A 933/2011, filed Jun. 27, 2011, the complete disclosures of which are hereby incorporated herein by reference in their entirety for all purposes.

The invention pertains to a method and a device for detecting straightness deviations and/or deformations in a rotary kiln, the rotary drum of which features bearing rings that are spaced apart from one another in the axial direction and respectively supported on rollers.

Rotary kilns are kilns for continuous processes in process engineering and used, for example, as clinker kilns in cement manufacturing plants. The rotary drum of such a kiln is slightly inclined in the longitudinal direction such that the revolution of the kiln cylinder causes an axial transport of the material in the interior of the kiln, namely from the inlet side to the outlet side. Rotary kilns used in the cement industry typically have lengths of 75 to 80 m, but occasionally also reach lengths up to 150 m, and diameters up to 6.5 m. The rotary drum of the rotary kiln features bearing rings that are spaced apart from one another in the axial direction and connected to the rotary drum by means of fastening systems that allow thermal expansions of the rotary drum during the operation of the kiln. The bearing rings are supported on rollers that respectively are supported rotatably about an axis extending in the axial direction of the rotary drum axis. Each bearing ring is usually assigned to two rollers that are arranged at a distance from one another and the rotational axes of which extend parallel to one another. The supporting height and the lateral position can be adjusted by adjusting the distance between two of the rollers that respectively support one bearing ring, wherein it is attempted to adjust the supporting height and the lateral position on all bearing rings in such a way that the rotary drum axis, i.e. the connection between the centres of the circular areas defined by all bearing rings, extends straight over the enbearing ring length of the rotary kiln.

Straightness deviations of the rotary kiln axis that may be caused, for example, by installation tolerances, wear of bearing rings, rollers and roller bearings during the operation of the kiln exert a dynamic bending stress on the rotary drum shell and therefore lead to the risk of cracking and increased abrasion.

Deviations of the parallelism of the rotational axes of the rollers with the rotary kiln axis lead to a significant increase in the friction between the bearing ring and the rollers on the one hand and to an uneven contact between the bearing ring and the rollers on the other hand. Both increase the abrasion and shorten the service life, i.e. the time, over which the rotary kiln can operate without interruption until the next maintenance procedure needs to be carried out.

The service life of a rotary kiln is also decisively influenced by deformations of the rotary drum shell. Such deformations may be created, in particular, due to high temperatures and have no relation whatsoever to the above-described straightness deviations of the rotary drum axis, but rather concern, in particular, local deviations from the straightness of the shell or the shell generatrix and the circularity of the shell cross section. The deformations of the rotary drum shell have negative effects on the refractory lining in the interior of the rotary drum.

The invention is based on the objective of disclosing a method and a device, by means of which straightness deviations and/or deformations in a rotary kiln can be measured with high accuracy such that potential deviations or deformations can be detected at an early stage and corrected in order to extend the service life of the rotary kiln. It should be possible to measure the respective straightness deviation or deformation without interrupting the operation of the rotary kiln. In addition, modifications to the existing construction of the respective rotary kiln should be avoided. Furthermore, it should be possible to carry out a simple measurement on existing kilns.

According to a first aspect of the invention, this objective is attained with a method for detecting straightness deviations and/or deformations in a rotary kiln, particularly a clinker kiln or lime kiln of a cement manufacturing plant or the like, with said method being characterized in that the outer surface area of the rotary drum, the bearing rings, the rollers and/or the shafts of the rollers is scanned in a contactless fashion with the aid of at least one scanning device such that three-dimensional position data regarding the scanned objects is obtained, and in that the three-dimensional position data is evaluated with respect to the occurrence of a deviation of the rotary kiln axis from a straight line, a deviation of the rotary drum from a cylindrical shape and/or a deviation of the rotational axes of the rollers from a line extending parallel to the rotary kiln axis. Since the objects are scanned in a contactless fashion, it merely needs to be ensured that the at least one scanning device can be installed adjacent to the rotary kiln, but constructive modifications to the kiln itself are not required. Optical scanning devices have a high accuracy such that relatively small deviations or deformations can also be measured. In certain rotary kilns, for example, it is advantageous if deviations and deformations can be measured within the range of a few millimeters. Optical scanning devices usually have a certain angular coverage such that several of the aforementioned objects can be simultaneously measured with a single scanning device.

Since the inventive method is based on the acquisition and processing of three-dimensional position data, an evaluation can be carried out with proven and tested software means, wherein it is also easily possible, in particular, to process the position data into a three-dimensional model of the scanned objects. In this case, the at least one scanning device may operate in such a way that it scans a plurality of points on the surface of the object to be scanned in accordance with a predetermined pattern or grid such that three-dimensional position data is obtained for each point. The three-dimensional model can be easily generated and, if applicable, displayed on a display unit by correlating the three-dimensional position data with the corresponding point within the predetermined pattern or grid.

Due to the contactless operating principle, another advantage of the inventive method is that scanning preferably can also be carried out during the operation of the rotary kiln.

Since rotary kilns can be very long, it is usually impossible to measure the enbearing ring length of a kiln with one scanning device. According to one preferred embodiment, it is therefore proposed that an axial section of the rotary kiln is scanned with the at least one scanning device, that scans are carried out in a plurality of axial sections distributed along the length of the kiln, wherein at least one reference point or reference object is respectively also measured during said scans, and that the three-dimensional position data is correlated with the respective reference point or reference object in order to obtain relative position data and the relative position data of several axial sections is combined and jointly evaluated. The reference point may consist, for example, of a stationary object that is specially installed for this purpose. Alternatively, it is also possible to forgo special reference points and to merely utilize the geometry of the bearing rings as reference object for assembling the different scans. The scans distributed along the length of the kiln may be carried out with a single scanning device that, however, needs to be displaced along the length of the kiln after each scan in order to respectively start a new scan in the new position. However, it is also possible to utilize several scanning devices that are distributed along the length of the kiln. The coverage area of the individual scans preferably overlaps, wherein at least one or, in particular, several of the aforementioned reference points or objects preferably are respectively arranged in the overlapping area such that adjacent scans can be correlated to the same stationary point and therefore jointly evaluated.

The rotary kiln is preferably scanned from both sides, i.e. the at least one scanning device is positioned on both sides of the vertical centre plane of the rotary kiln that extends through the rotational axis. In this way, both of the rollers that are respectively assigned to one bearing ring can be scanned.

Straightness deviations of the rotary kiln axis are preferably measured in such a way that three-dimensional position data representing points on the circumference of the bearing rings is obtained during the scanning of the bearing rings, that a circle is computationally adapted to the points on the circumference of each bearing ring, that the centre of each circle is determined, that the kiln axis is computationally obtained as the connection between the centres, that the kiln axis is compared with a straight line and that possible deviations are output.

Deformations of the rotary kiln shell are preferably measured in such a way that three-dimensional position data representing surface points is obtained during the scanning of the surface area of the rotary drum, and that said three-dimensional position data is linked with rotational angle data that represents the instantaneous rotational angle of the rotary drum at the time of the scan of the respective surface point. In this way, the shell can be scanned during the operation of the kiln, i.e. during the rotation of the rotary drum. It is in this context advantageous to proceed in such a way that a three-dimensional model of the rotary drum is generated from the three-dimensional position data representing the surface points and the respectively assigned rotational angle data. The three-dimensional model is then preferably compared with a cylindrical comparison model, wherein local deviations of the three-dimensional model from the comparison model are indicated. In this case deviations can occur in different respects. Local deviations of the cross section of the rotary drum from a circular cross section and deviations of the axis of the rotary drum from a straight line preferably are indicated separately of one another.

Deviations in the parallelism of the rollers are preferably measured in such a way that the scanning of the rollers includes the scanning of reference objects, particularly reference spheres, that are arranged on both ends of the rotational axes of the rollers. It is in this context advantageous to proceed in such a way that the rotational axis of the rollers is computationally obtained as the connection between the reference objects, and that the parallelism of the rotational axis with the kiln axis is determined and deviations from this parallelism are indicated.

In the context of the inventive method, the scanning by means of 3D laser scanning is particularly preferred. Laser scanning refers to the line-by-line or grid-like scanning of surfaces or bodies with a laser beam. In 3D laser scanning, the surface geometry of the scanned object is measured digitally by means of the pulse transit time, the phase difference in comparison with a reference or by means of the triangulation of laser beams. This results in a discrete quantity of three-dimensional scanning points that is referred to as a point cloud. The coordinates of the measured points are determined from the angles and from the distance referred to the origin (device position). The point cloud makes it possible to determine individual dimensions such as, e.g., lengths and angles or a closed surface of triangles can be constructed (meshing) of this point cloud and used for visualization purposes, e.g., in 3D computer graphics.

According to a second aspect of the invention, the basic objective of the invention is attained with a device that is characterized by at least one scanning device that operates in a contactless fashion and is arranged in order to scan the outer surface area of the rotary drum, the bearing rings, the rollers and/or the shafts of the rollers in a contactless fashion such that three-dimensional position data regarding the scanned objects is obtained, wherein the three-dimensional position data is fed to an arithmetic unit that features an evaluation circuit in order to evaluate the three-dimensional position data with respect to the occurrence of a deviation of the rotary kiln axis from a straight line, a deviation of the rotary drum from a cylindrical shape and/or a deviation of the rotational axes of the rollers from a line extending parallel to the rotary kiln axis.

The scanning device is preferably realized in the form of a 3D laser scanner.

The coverage area of the at least one scanning device preferably corresponds to an axial section of the rotary kiln, wherein one or more scanning devices are distributed along the length of the kiln, wherein at least one stationary reference point or at least one reference object preferably is arranged within the coverage area of each scanning device, and wherein the arithmetic unit is designed for correlating the three-dimensional position data with the respective reference point in order to obtain relative position data, as well as for combining and jointly evaluating the relative position data of several axial sections.

At least one scanning device preferably is arranged on each side of the rotary kiln.

The scanning devices preferably are directed at the bearing rings such that three-dimensional position data representing points on the circumference of the bearing rings is obtained, wherein the position data is fed to the arithmetic unit and the arithmetic unit features processing means for computationally adapting a circle to the points on the circumference of each bearing ring, for determining the centre of each circle, for computationally obtaining the kiln axis as the connection between the centres and for comparing the kiln axis with a straight line, and wherein output means are provided that cooperate with the arithmetic unit in order to output possible deviations of the kiln axis from a straight line.

The at least one scanning device preferably is directed at the surface area of the rotary drum such that three-dimensional position data representing surface points is obtained, wherein at least one rotational angle sensor for acquiring rotational angle data representing the instantaneous rotational angle of the rotary drum or a pulse sensor for determining the rotation of the rotary drum is provided and the position data and the rotational angle data is fed to the arithmetic unit, and wherein the position data is linked with the rotational angle data that represents the instantaneous rotational angle of the rotary drum at the time of the scan of the respective surface point.

Processing means of the arithmetic unit preferably are designed for generating a three-dimensional model of the rotary drum from the three-dimensional position data representing the surface points and the respectively assigned rotational angle data.

The processing means preferably are designed for comparing the three-dimensional model with a cylindrical comparison model, wherein output means are provided that cooperate with the processing means in order to output local deviations of the three-dimensional model from the comparison model.

The at least one scanning device preferably is directed at the reference objects, particularly reference spheres, that are arranged on the ends of the roller shaft.

Processing means of the arithmetic unit preferably are designed for computationally obtaining the rotational axis of the rollers as the connection between the reference objects and for determining the parallelism of the rotational axis with the kiln axis, wherein output means are provided that cooperate with the arithmetic unit in order to output deviations from said parallelism.

The invention is described in greater detail below with reference to an exemplary embodiment that is schematically illustrated in the drawings. In these drawings, FIG. 1 shows a perspective side view of a rotary kiln and FIG. 2 shows a detail of the mounting of the bearing rings on the rotary drum shell.

Figure 2:
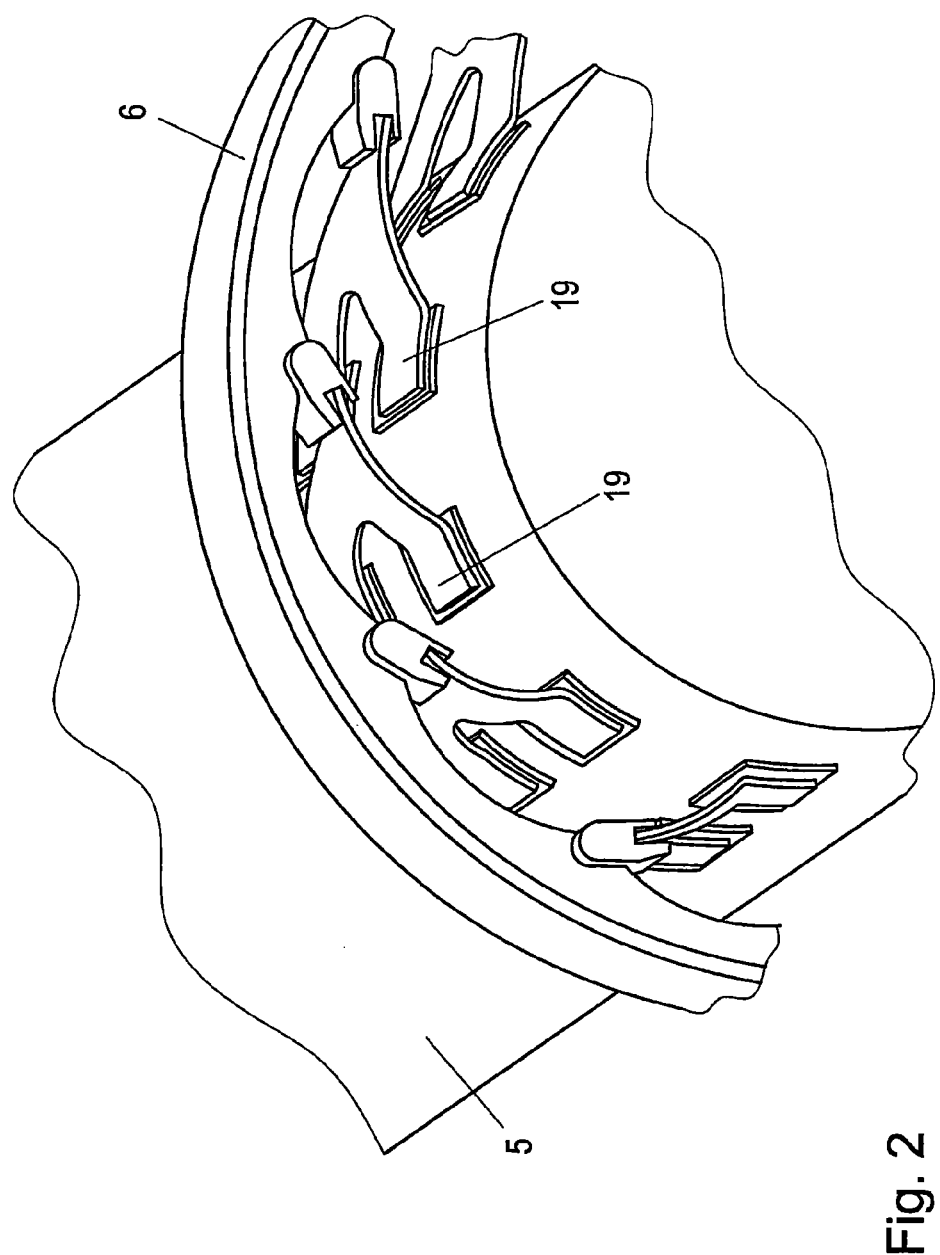

FIG. 1 shows an axial section of a rotary kiln 1, wherein the rotary kiln 1 is supported on three stationary roller stands 2. The rotary kiln 1 features a rotary drum 4 that is supported rotatably about axis 3 and the shell of which is identified by reference symbol 5. In the example shown, three spaced-apart bearing rings 6 are mounted on the shell 5 of the rotary drum 4 by means of a mounting system that is illustrated in greater detail in FIG. 2. The drive of the rotary drum 4 is not illustrated in order to provide a better overview. The drive is usually realized by means of a gear rim that is connected to the shell 5 of the rotary drum 4 in a rotationally rigid fashion. A drive for such a gear rim is described, e.g., in WO 2010/067183 A1.

Each bearing ring 6 is supported on two assigned rollers 7, wherein the rollers 7 are respectively supported rotatably about a rotational axis 8 that extends parallel to the rotary drum axis 3.

The rotational axis 3 of the rotary drum 4 is defined as the axis that results from the connection between the imaginary centres of the individual bearing rings 6. The centres 9 of the bearing rings 6 should ideally lie on a straight line. In practical applications, however, deviations occur as illustrated in FIG. 1 such that the centre of the central bearing ring lies excessively low and the connection between the centres of the left and the central bearing ring 6 and the connection between the centres of the central and the right bearing ring 6 include an obtuse angle. In practical applications, maximum deviations of 3 to 10 mm from the ideal state are tolerated in the vertical direction and/or in the lateral direction. Any higher deviations would lead to a significant increase in the dynamic bending stress of the rotary drum 4 and therefore increased abrasion.

FIG. 1 also shows that the axial region of the rotary drum shell 5 indicated with the reference symbol 10 features such deformations that the shell cross section deviates from a circular shape. In the region of the rotary kiln that is schematically indicated with the reference symbol 11, the rotary drum 4 features such a deformation referred to the ideal circular cylindrical shape that the generations of the cylinder no longer extend straight, but rather curved.

In order to measure the different straightness deviations and deformations of the rotary kiln with high accuracy, a 3D laser scanner 12 is arranged laterally adjacent to the rotary kiln in accordance with the invention, wherein the coverage area of said laser scanner is identified by the reference symbol 13. The laser scanner 12 scans the surface of the rotary drum 4, the bearing ring 6 and the rollers 7 within the coverage area 13. Due to the scanning, a plurality of three-dimensional position data is obtained within the coverage area 13 and this three-dimensional position data is fed to an arithmetic unit 14. The three-dimensional position data is evaluated in the arithmetic unit 14, wherein the result of the evaluation is displayed on a schematically illustrated output device 15 such as, e.g., a monitor. A stationary reference object 16 mounted on the roller stand 2 is arranged within the coverage area 13 and used as a reference point in the determination of the position data. In the present exemplary embodiment, the coverage area 13 of the laser scanner 12 merely extends over an axial section of the rotary kiln 1 such that several measurements need to be carried out successively with the laser scanner 12 that is correspondingly displaced in the axial direction, wherein the respective coverage areas 13 preferably overlap. Alternatively, a plurality of laser scanners 12 is utilized and the scanning of the rotary kiln 1 is accordingly carried out simultaneously with the plurality of laser scanners 12. The laser scanners 12 can either be arranged on only one side of the rotary kiln or on both sides in order to allow a more precise evaluation. In order to jointly evaluate the measurements carried out by several laser scanners 12 or in several adjacent sections that are axially offset relative to one another, a reference object 16 is arranged in each of the preferably overlapping coverage areas 13.

Except for the reference objects 16, the scanning of the surface of the rotary drum 14 and of the bearing rings 6 requires no further installations or modifications of the rotary kiln 1. In order to measure deviations of the rotational axis 8 of the rollers 7 from a line extending parallel to the rotary drum axis 3, however, it is advantageous to respectively arrange one reference object 18 that can be measured by the laser scanner 12 on the ends of the roller shaft 17. In this case, the rotational axis 8 of the rollers 7 is determined in the arithmetic unit 14 as the connection between the position data determined for the two reference objects 18.

FIG. 2 shows plates 19 that are tangentially supported on the shell 5 of the rotary drum 4 and connect the rotary kiln 1 to the bearing ring 6. The spring effect of the plates 19 makes it possible to easily compensate a thermal expansion of the rotary drum 4.

The invention claimed is:

1. A rotary kiln with a device for detecting straightness deviations and deformations of the rotary kiln, wherein the rotary kiln includes a rotary drum having bearing rings spaced apart from one another in the axial direction and respectively supported on rollers, roller shafts and shaft end extensions of the rollers, the device for detecting straightness deviations and deformations of the rotary kiln comprises scanning devices that operate in a contactless fashion configured to scan (a) the outer surface area of the rotary drum, (b) the bearing rings, and (c) at least one of: the rollers, the roller shafts, or the shaft end extensions of the rollers such that three-dimensional position data regarding the scanned objects is obtained, an arithmetic unit in communication with the scanning devices, wherein the three-dimensional position data is fed to the arithmetic unit that features an evaluation circuit in order to evaluate the three-dimensional position data with respect to the occurrence of a deviation of at least two of (i) the rotary kiln axis from a straight line, (ii) a deviation of the rotary drum from a cylindrical shape and (iii) a deviation of the rotational axes of the rollers from a line extending parallel to the rotary kiln axis, wherein the coverage area of the at least one of the scanning devices corresponds to an axial section of the rotary kiln, the scanning devices are distributed along the length of the rotary kiln, wherein at least one stationary reference point or at least one reference object is arranged within the coverage area of each scanning device distributed along that length, and the arithmetic unit is configured for correlating the three-dimensional position data with the respective reference point in order to obtain relative position data, and for combining and jointly evaluating the relative position data of several axial sections.

2. The rotary kiln according to claim 1, wherein at least one of the scanning devices comprises a 3D laser scanner.

3. The rotary kiln according to claim 1, wherein at least one of the scanning device is arranged on each side of the rotary kiln.

4. The rotary kiln according to claim 1, wherein the position data is fed to the arithmetic unit, the arithmetic unit features processing means for computationally adapting a circle to the points on the circumference of each bearing ring, for determining the centre of each circle, for computationally obtaining the kiln axis as the connection between the centres and for comparing the kiln axis with a straight line; and output means, in cooperation with the arithmetic unit, in order to output possible deviations of the kiln axis from a straight line.

5. The rotary kiln according to claim 1, wherein the device for detecting straightness deviations and deformation of the rotary kiln includes at least one rotational angle sensor for acquiring rotational angle data representing the instantaneous rotational angle of the rotary drum or one pulse sensor for determining the rotation of the rotary drum, wherein the position data and the rotational angle data is fed to the arithmetic unit, and the position data is linked with the rotational angle data that represents the instantaneous rotational angle of the rotary drum at the time of the scan of the respective surface point.

6. The rotary kiln according to claim 5, wherein the arithmetic unit includes processing means to generate a three-dimensional model of the rotary drum from the three-dimensional position data representing the surface points and the respectively assigned rotational angle data.

7. The rotary kiln according to claim 6, wherein the processing means includes comparing the three-dimensional model with a cylindrical comparison model; and the arithmetic unit includes output means that cooperates with the processing means in order to output local deviations of the three-dimensional model from the comparison model.

8. The rotary kiln according to claim 1, wherein reference objects are arranged at the ends of roller shafts, the reference objects comprise spheres, and the device for detecting straightness deviations and deformation of the rotary kiln has at least one scanning device having coverage including reference objects on a roller shaft.

9. The rotary kiln according to claim 8, wherein the processing means of the arithmetic unit is additionally designed for computationally obtaining the rotational axis of the rollers as the connection between the reference objects and for determining the parallelism of the rotational axis with the kiln axis; and the output means cooperates with the arithmetic unit in order to output deviations from said parallelism.

10. The rotary kiln according to claim 1, wherein the rotary kiln is a clinker kiln for cement manufacturing or a lime kiln for lime manufacturing.

11. The rotary kiln according to claim 1, wherein the arithmetic unit evaluates three-dimensional position data with respect to the occurrence of two of said deviations (i), (ii) and (iii).

12. The rotary kiln according to claim 1, wherein the arithmetic unit evaluates three-dimensional position data with respect to the occurrence of all three of said deviations (i), (ii) and (iii).

13. A rotary kiln with a device for detecting straightness deviations and deformations of the rotary kiln, the rotary kiln having (i) a rotary drum having bearing rings that are spaced apart from one another in the axial direction and respectively supported on rollers having roller shafts and shaft end extensions of the rollers; (ii) axial sections along the length of the rotary kiln; and (iii) a rotary axis;

the device for detecting straightness deviations and deformations of the rotary kiln comprising at least one scanning device configured to be displaced along the length of the rotary kiln to a scanning position, the at least one scanning device having a scanning coverage area, the at least one scanning device configured so that axial sections are scanned, the at least one scanning device configured and arranged to scan the outer surface area of the rotary drum, the bearing rings, the rollers, the shafts, or shaft end extensions of the rollers in a contactless fashion for the axial sections scanned within the scanning coverage area as the at least one scanning device is displaced along the length of the rotary kiln, whereby three-dimensional position data regarding the scanned objects is obtained;

at least one stationary reference point or at least one reference object within the scanning coverage area for the scanning position;

an arithmetic unit connected to the at least one scanning device, wherein the three-dimensional position data from the at least one scanning device is fed to the arithmetic unit that has an evaluation circuit for evaluating the three-dimensional position data with respect to the occurrence of a deviation of the rotary axis from a straight line, a deviation of the rotary drum from a cylindrical shape and a deviation of the rotational axes of the rollers from a line extending parallel to the rotary axis, and the arithmetic unit correlating the three-dimensional position data with the respective stationary reference point or the respective reference object to obtain relative position data and combining and jointly evaluating the relative position data for each of the axial sections that is scanned.

* * * * *